No. 618,726. Patented Jan. 31, 1899.
C. PHELPS.
ALARM LOCK FOR BICYCLES.
(Application filed Mar. 26, 1898.)
(No Model.)
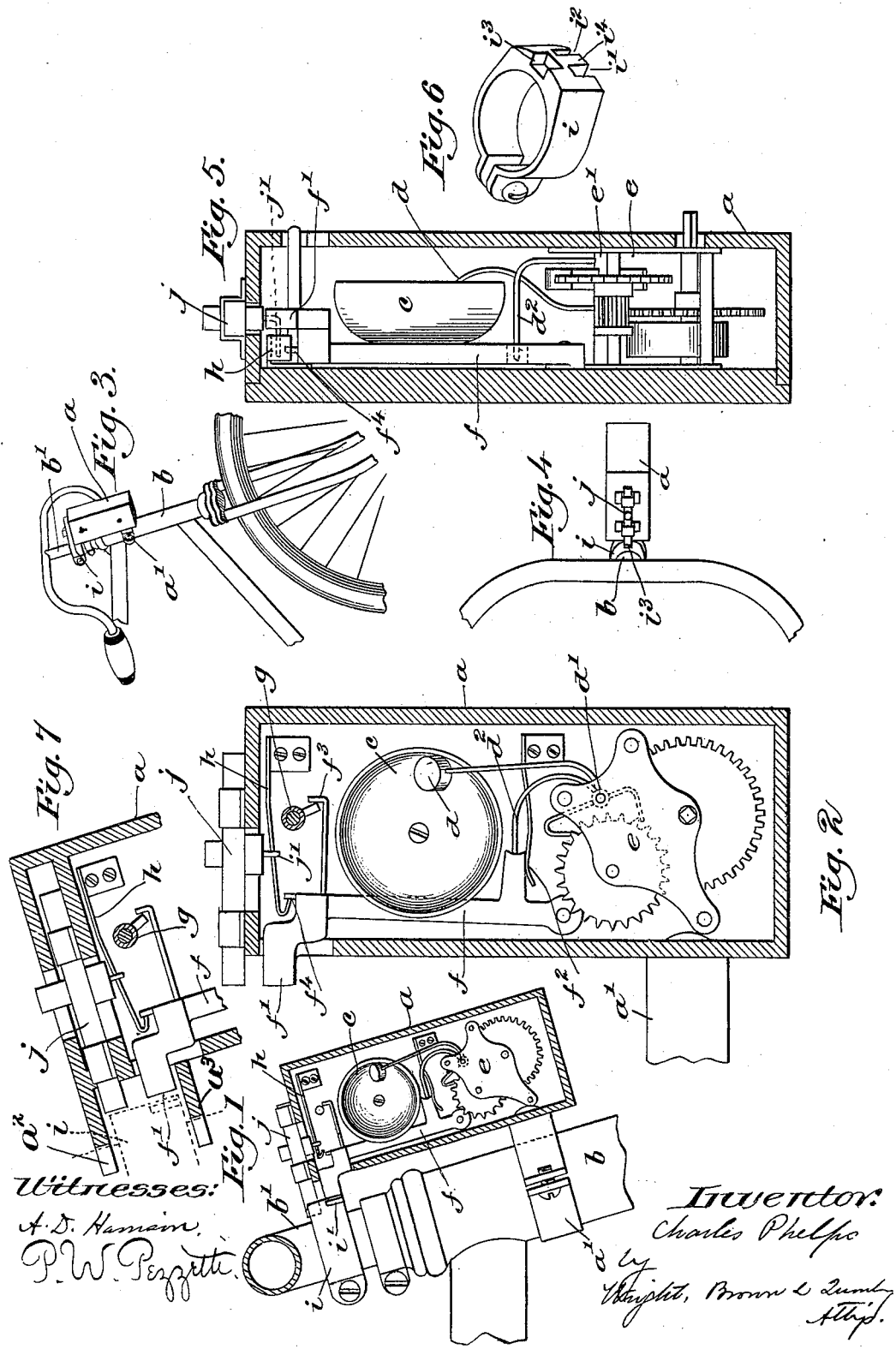
Witnesses:
A. D. Harriman
P. W. Pezzetti
Inventor:
Charles Phelps
by
Wright, Brown & Quinby
Attys.

UNITED STATES PATENT OFFICE.

CHARLES PHELPS, OF SALEM, MASSACHUSETTS.

ALARM-LOCK FOR BICYCLES.

SPECIFICATION forming part of Letters Patent No. 618,726, dated January 31, 1899.

Application filed March 26, 1898. Serial No. 675,260. (No model.)

*To all whom it may concern:*

Be it known that I, CHARLES PHELPS, of Salem, in the county of Essex and State of Massachusetts, have invented certain new and useful Improvements in Alarm-Locks for Bicycles, of which the following is a specification.

This invention has for its object to provide a combined lock and alarm for bicycles which may be employed to protect the bicycle or similar vehicle during the temporary absence of the owner when the bicycle is left in an exposed place.

The invention consists in a contrivance embodying an alarm mechanism and a locking mechanism. The contrivance is so arranged that a bell will be rung if the bicycle is disturbed and at the same time the steering mechanism will be locked, so that the bicycle cannot be ridden. There is also employed an additional locking mechanism which may be adjusted so that the steering portion of the bicycle will be held in a fixed position. This second lock is intended to be placed in plain sight and so constructed that it may be unlocked by hand.

Of the accompanying drawings, forming a part of this specification, Figure 1 is a view in side elevation and section, representing an alarm-lock constructed in accordance with my invention as applied to a bicycle. Fig. 2 represents a section through the casing of the device, showing the inner parts in side elevation. Fig. 3 represents a perspective view, on a smaller scale, showing the position of the device on a bicycle. Fig. 4 represents a top plan view of the device and parts of the bicycle. Fig. 5 represents a rear elevation of the parts inside the casing. Fig. 6 represents a detail perspective view of a part adapted to be attached to the steering portion of the bicycle. Fig. 7 represents a sectional view showing a modification.

The same reference characters indicate the same parts in all the figures.

In the drawings, $a$ represents a casing inclosing the main parts of the mechanism and adapted to be attached to the head $b$ of a bicycle or similar vehicle by means of a split collar $a'$. Inside of the casing is a bell $c$, adapted to be rung by the action of a striker $d$, actuated by clockwork $e$.

$f$ is a pivoted bolt having a locking portion $f'$, which projects through an aperture in the back of the casing. Said bolt is arranged to be projected toward the steering-post of the bicycle by means of a spring $f^2$ and is provided with a hook $f^3$, adapted for engagement by a key $g$, which may be operated to withdraw the bolt into the casing. The bolt is held retracted by means of a spring-latch $h$, which engages a pin $f^4$ on the bolt. The escapement-arbor $d'$, on which the striker $d$ is mounted, is provided with an arm $d^2$, which is adapted to be engaged by the bolt $f$ in such a manner that when the said bolt is retracted the striker will be held from operation, but when the bolt is projected the striker is free to operate.

$i$ is a keeper formed with a split collar adapting it to be secured to the steering-post $b'$ of the bicycle above the head. The said keeper is formed with three notches or sockets $i'$ $i^2$ $i^3$, the notch $i^3$ being located above the other two. The notches $i'$ $i^2$ are adapted to be entered by the locking-tongue $f'$ of the bolt $f$. The notch $i^3$ is adapted to be entered by the end of a sliding bolt $j$, mounted on top of the casing $a$ and arranged to be moved by hand. The bolt $j$ is provided inside the casing with a finger $j'$, which takes under the spring-latch $h$ and is so arranged that when the bolt is projected or slid toward the steering-post of the bicycle the finger will act to lift the end of said latch and disengage the same from the pin $f^4$, thus allowing the spring $f^2$ to project the bolt $f$. When the bolt $j$ is withdrawn, the finger $j'$ allows the spring-latch to move into position to engage the pin $f^4$.

Fig. 2 shows the position of the locking and alarm parts when the device is not in use.

The operation of the invention is as follows: When the owner of the bicycle intends to leave the same temporarily in an exposed place, he stands his bicycle against a support and places the steering-wheel in such a position that the sliding bolt $j$ will enter the notch $i^3$ in the keeper $i$. He then pushes said bolt into the notch, and thereby releases the pivoted bolt $f$ and allows the end of the locking-tongue $f'$ to rest on that portion $i^4$ of the keeper which lies between the two lower notches $i'$ and $i^2$. When the bolt $f$ is in this position, the alarm mechanism is still restrained from operation, but is "set" or put in operative relation with the steering parts of the bicycle. When the device is thus arranged, the bicycle cannot be ridden because the steering-wheel is locked; but by reason of the fact that the sliding bolt $j$ is in plain sight and its operation would be very evident to an intending thief the probability is that the thief would withdraw said bolt from its engagement with the keeper $i$ in order to allow the bicycle to be steered. In case, however, he turns the steering-wheel even a slight distance the bolt $f$ will be projected into either one of the notches $i'$ $i^2$ and will thereby release the alarm mechanism, causing the bell $c$ to be rung, and will at the same time again lock the steering-wheel and prevent the same from being moved.

The device as here shown is so arranged that the sliding bolt $j$ might be dispensed with and the pivoted bolt $f$ released by turning the key $g$ so that it engages and raises the spring-latch $h$. It will also be understood that the bolt $f$ could be released and placed in condition for operation by using the key $g$ even when the bolt $j$ is present.

Fig. 7 shows a modified construction, wherein are employed guard-flanges $a^2$ $a^3$, attached to the casing $a$ and projecting toward the steering-post. The flanges are located above and below the keeper $i$, so as to cover the notches in the latter and prevent access thereto.

I do not wish to be confined to the exact details of construction above set forth, as the same may be variously modified without departing from the spirit of my invention.

I claim—

1. The combination with the steering parts of a bicycle, of a combined locking and alarm device comprising a normally-restrained alarm mechanism adapted to be operated by turning the steering parts, a normally-restrained locking mechanism adapted to lock the steering parts when the same are turned, and a secondary locking mechanism adapted to be moved to lock the steering parts and at the same time release the main locking mechanism and set the alarm mechanism.

2. The combination with the steering parts of a bicycle, of a combined locking and alarm device comprising an alarm mechanism, and a locking device adapted to lock the steering parts when the same are turned and at the same time cause the alarm mechanism to be actuated.

3. The combination with the steering-post of a bicycle, of a notched member secured to said post above the steering-head, and an alarm mechanism mounted on the bicycle-frame and having a part adapted to engage the notched member when the steering-post is turned, and thereby operate the alarm.

4. The combination with the steering-post of a bicycle, of a member provided with a collar surrounding and secured to said steering-post above the steering-head, and an alarm mechanism mounted on the bicycle-frame and having a part adapted to engage the said member when the steering-post is turned, and thereby operate the alarm.

5. The combination with the steering parts of a bicycle, of a normally-restrained alarm mechanism, and a locking device adapted to be moved to lock the steering parts and at the same time set the alarm mechanism.

6. The combination with the steering-post of a bicycle, of a forwardly-projecting member attached to said post and formed with a notch or notches, a casing attached to the bicycle-frame and containing a bolt adapted to enter said notches, and a guard-flange projecting from the casing toward the steering-post and arranged to prevent access to said notches.

In testimony whereof I have affixed my signature in presence of two witnesses.

CHARLES PHELPS. [L. S.]

Witnesses:
CHARLES H. ODELL,
HARRY D. TREADWELL.